(12) United States Patent
Kashyap (10) Patent No.: US 10,397,546 B2
(45) Date of Patent: Aug. 27, 2019

(54) RANGE IMAGING

(71) Applicant: Microsoft Technology Licensing, LLC., Redmond, WA (US)

(72) Inventor: Abhinav Kashyap, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 355 days.

(21) Appl. No.: 14/870,013

(22) Filed: Sep. 30, 2015

(65) Prior Publication Data

US 2017/0094248 A1    Mar. 30, 2017

(51) Int. Cl.
| | |
|---|---|
| H04N 13/211 | (2018.01) |
| H04N 13/254 | (2018.01) |
| H04N 13/271 | (2018.01) |
| H04N 5/33 | (2006.01) |
| G01S 17/87 | (2006.01) |
| G01S 17/89 | (2006.01) |
| G01S 7/00 | (2006.01) |
| G01S 7/484 | (2006.01) |
| H04W 88/02 | (2009.01) |

(52) U.S. Cl.
CPC ............ *H04N 13/211* (2018.05); *G01S 7/003* (2013.01); *G01S 7/484* (2013.01); *G01S 17/87* (2013.01); *G01S 17/89* (2013.01); *H04N 5/33* (2013.01); *H04N 13/254* (2018.05); *H04N 13/271* (2018.05); *H04W 88/02* (2013.01)

(58) Field of Classification Search
CPC .......... G01S 17/87; G01S 17/89; G01S 7/006; G01S 7/484; G01S 11/12; H04B 10/5561
See application file for complete search history.

(56) References Cited

U.S. PATENT DOCUMENTS

| | | |
|---|---|---|
| 5,581,323 A | 12/1996 | Suzuki et al. |
| 5,625,410 A | 4/1997 | Washino et al. |
| 5,717,512 A | 2/1998 | Chmielewski, Jr. et al. |
| 5,839,000 A | 11/1998 | Davis, Jr. et al. |
| 6,152,563 A | 11/2000 | Hutchinson et al. |
| 6,778,263 B2 | 8/2004 | Ortyn et al. |
| 7,405,812 B1 | 7/2008 | Bamji |
| 7,542,210 B2 | 6/2009 | Chirieleison, Sr. |
| 7,912,252 B2 | 3/2011 | Ren et al. |
| 8,063,750 B2 | 11/2011 | Knibbe |
| 8,180,298 B2 | 5/2012 | Drude |
| 8,331,418 B2 | 12/2012 | Chou |
| 8,355,117 B2 | 1/2013 | Niclass |

(Continued)

FOREIGN PATENT DOCUMENTS

| | | |
|---|---|---|
| CN | 102073050 B | 5/2011 |
| DE | 102011089636 A1 | 6/2012 |

(Continued)

OTHER PUBLICATIONS

Litos, et al., "Synchronous Image Acquisition based on Network Synchronization", In Proceedings of the Conference on Computer Vision and Pattern Recognition Workshop, Jun. 17, 2006, 6 pages.

(Continued)

*Primary Examiner* — Luke D Ratcliffe (57) ABSTRACT

Apparatus for controlling a plurality of active illumination range cameras to operate in a time division multiplexed operating mode to acquire range images of scenes that the cameras image.

20 Claims, 4 Drawing Sheets

(56) References Cited

U.S. PATENT DOCUMENTS

| | | |
|---|---|---|
| 8,408,706 B2 | 4/2013 | Yahav |
| 8,487,838 B2 | 7/2013 | Lewis et al. |
| 8,593,375 B2 | 11/2013 | Maltz |
| 8,602,887 B2 | 12/2013 | Tardif et al. |
| 8,723,924 B2 | 5/2014 | Mirbach et al. |
| 8,872,910 B1 | 10/2014 | Vaziri |
| 8,879,050 B2 | 11/2014 | Ko |
| 8,888,287 B2 | 11/2014 | Yahav |
| 8,941,561 B1 | 1/2015 | Starner |
| 8,988,662 B1 | 3/2015 | Haskin et al. |
| 8,998,414 B2 | 4/2015 | Bohn |
| 9,079,103 B2 | 7/2015 | Russo et al. |
| 9,723,992 B2 | 8/2017 | Senechal et al. |
| 9,769,368 B1 | 9/2017 | Morford et al. |
| 2003/0125019 A1 | 7/2003 | Bajikar |
| 2003/0181213 A1 | 9/2003 | Sugar et al. |
| 2004/0259589 A1 | 12/2004 | Bahl et al. |
| 2006/0024041 A1 | 2/2006 | Lou et al. |
| 2008/0240048 A1 | 10/2008 | Okker et al. |
| 2009/0039734 A1 | 2/2009 | Takahashi et al. |
| 2009/0052037 A1 | 2/2009 | Wernersson |
| 2009/0163185 A1 | 6/2009 | Lim et al. |
| 2010/0123770 A1 | 5/2010 | Friel et al. |
| 2010/0214419 A1 | 8/2010 | Kaheel et al. |
| 2010/0315905 A1 | 12/2010 | Lee et al. |
| 2011/0006978 A1 | 1/2011 | Yuan |
| 2011/0216744 A1 | 9/2011 | Taaghol et al. |
| 2011/0298898 A1 | 12/2011 | Jung et al. |
| 2012/0033045 A1 | 2/2012 | Schweizer et al. |
| 2012/0098964 A1 | 4/2012 | Oggier et al. |
| 2012/0098965 A1 | 4/2012 | Barcala |
| 2012/0133754 A1 | 5/2012 | Lee et al. |
| 2012/0230250 A1 | 9/2012 | Kasslin et al. |
| 2012/0314077 A1 | 12/2012 | Clavenna et al. |
| 2013/0063550 A1 | 3/2013 | Ritchey et al. |
| 2013/0128052 A1 | 5/2013 | Catrein et al. |
| 2013/0222638 A1 | 8/2013 | Wheeler et al. |
| 2013/0242058 A1 | 9/2013 | Bak et al. |
| 2013/0258089 A1 | 10/2013 | Lyons et al. |
| 2013/0314421 A1 | 11/2013 | Kim |
| 2014/0043227 A1 | 2/2014 | Skogo et al. |
| 2014/0055771 A1 | 2/2014 | Oggier |
| 2014/0071234 A1 | 3/2014 | Millett |
| 2014/0094307 A1 | 4/2014 | Doolittle et al. |
| 2014/0104394 A1 | 4/2014 | Yanai et al. |
| 2014/0133825 A1 | 5/2014 | Kozloski et al. |
| 2014/0240464 A1 | 8/2014 | Lee |
| 2014/0240469 A1 | 8/2014 | Lee |
| 2014/0266988 A1 | 9/2014 | Fisher et al. |
| 2014/0333917 A1 | 11/2014 | Payne et al. |
| 2014/0355947 A1 | 12/2014 | Slamecka et al. |
| 2015/0002392 A1 | 1/2015 | Kempinski |
| 2015/0003370 A1 | 1/2015 | Yokomakura et al. |
| 2015/0009049 A1 | 1/2015 | Subramanya |
| 2015/0148088 A1 | 5/2015 | Ericson |
| 2015/0180581 A1* | 6/2015 | Steiner ............... H04B 10/5561 398/188 |
| 2015/0201023 A1 | 7/2015 | Kotab |
| 2015/0346814 A1 | 12/2015 | Thukral et al. |
| 2015/0358584 A1 | 12/2015 | Mattson |
| 2016/0026253 A1 | 1/2016 | Bradski et al. |
| 2016/0275641 A1 | 9/2016 | Bostick et al. |
| 2017/0188019 A1 | 6/2017 | Kashyap |
| 2017/0272731 A1 | 9/2017 | Kashyap |

FOREIGN PATENT DOCUMENTS

| | | | |
|---|---|---|---|
| EP | 1647839 A2 | | 4/2006 |
| WO | 2007097738 | | 8/2007 |
| WO | 2011084799 A1 | | 7/2011 |
| WO | 2013026678 A1 | | 2/2013 |
| WO | 2013066334 | | 5/2013 |
| WO | 2013127973 A1 | | 9/2013 |
| WO | 2014072100 | | 5/2014 |
| WO | 2014072100 A1 | | 5/2014 |
| WO | 2014180553 A1 | | 11/2014 |
| WO | 2015006475 | | 5/2015 |
| WO | 2015107529 A1 | | 7/2015 |
| WO | WO2015107529 | * | 7/2015 ............... G01C 3/08 |

OTHER PUBLICATIONS

"About the Motion Capture Module", Retrieved on: Oct. 14, 2015, Available at: http://download.autodesk.com/us/maya/MayaMatchMoverOnlineHelp/index.html?url=WS73099cc142f48755-385a98b012180d20f19-5e06.htm,topicNumber=d0e17487.

Lussier, et al., "Automatic Calibration of RGBD and Thermal Cameras ", In Proceedings IEEE International Conference on Intelligent Robots and Systems, Sep. 14, 2014, pp. 451-458.

"International Preliminary Report on Patentability Issued in PCT Application No. PCT/US2016/043801", dated Jul. 17, 2017, 6 Pages.

International Search Report and Written Opinion Issued in PCT Application No. PCT/US2016/043801, dated Oct. 19, 2016, 11 Pages.

Graupner, et al., "Evaluating Requirements for Gaze-Based Interaction in a See-Through Head Mounted Display", Proceedings of the symposium on Eye tracking research & applications, Mar. 26, 2008, pp. 91-94.

Kozma, et al., "GaZIR: Gaze-based Zooming Interface for Image Retrieval", In Proceedings of the 11th International Conference on Multimodal Interfaces, Nov. 2, 2009, 8 pages.

Chennamma, et al., "A Survey on Eye-Gaze Tracking Techniques", In Proceedings of Indian Journal of Computer Science and Engineering, vol. 4, Issue 5, Oct. 2013, pp. 388-394.

"International Search Report and Written Opinion Issued in PCT Application No. PCT/US2016/048920", dated Nov. 30, 2016, 12 Pages.

Basso, et al., "Online Calibration for Networks of Cameras and Depth Sensors", In Proceedings of 12th Workshop on Non-classical Cameras, Camera Networks and Omnidirectional Vision, May 31, 2014, 6 pages.

Jamalabdollahi, et al., "Energy Efficient Ranging in Wireless Sensor Networks via a New Time Slot-based Round-Trip Algorithm", In Proceedings of IEEE Aerospace Conference, Mar. 1, 2014, pp. 1-7.

"Second Written Opinion Issued in PCT Application No. PCT/US2016/048920", dated Aug. 31, 2017, 8 Pages.

Non-Final Office Action dated Sep. 7, 2017 for U.S. Appl. No. 14/979,602, filed Dec. 28, 2015.

Non-Final Office Action dated Oct. 3, 2017 for U.S. Appl. No. 14/836,490, filed Aug. 26, 2015.

"International Preliminary Report on Patentability Issued in PCT Application No. PCT/US2016/048920", dated Dec. 19, 2017, 8 Pages.

"Design Principles for Voice Over WLAN", Retrieved From: https://web.archive.org/web/20140227160101/http://www.cisco.com/c/en/us/solutions/collateral/wireless/4400-series-wireless-lan-controllers/net_implementation_white_paper0900aecd804f1a46.html, Retrieved on: Feb. 27, 2014, 16 Pages.

"Application as Filed in U.S. Appl. No. 14/542,455", filed Nov. 14, 2014, 29 Pages.

"Final Office Action Issued in U.S. Appl. No. 14/979,602", dated Feb. 2, 2018, 26 Pages.

"Non Final Office Action Issued in U.S. Appl. No. 14/979,602", dated Jul. 19, 2018, 28 Pages.

Holmlund, "Characterization and Compensation of Stray Light Effects in Time of Flight Based Range Sensors", In Master's Thesis in Engineering Physics, Department of Physics, Umea University, May 2013, 86 Pages.

Kim, et al., "Multi-View Image and ToF Sensor Fusion for Dense 3D Reconstruction", In Proceedings of IEEE 12th International Conference on Computer Vision Workshops, Sep. 27, 2009, 8 pages.

Payne, et al., "Multiple Frequency Range Imaging to Remove Measurement Ambiguity", In Proceedings of at 9th Conference on Optical 3-D Measurement Techniques, Jul. 1, 2009, pp. 139-148.

(56) References Cited

OTHER PUBLICATIONS

"International Search Report and Written Opinion Issued in PCT Application No. PCT/US2017/021472", dated May 29, 2017, 11 Pages.

"Final Office Action Issued in U.S. Appl. No. 14/979,602", dated Nov. 28, 2018, 29 Pages.

"Non Final Office Action Issued in U.S. Appl. No. 15/071,246", dated Nov. 19, 2018, 9 Pages.

"Non Final Office Action Issued in U.S. Appl. No. 14/979,602", dated Mar. 29, 2019, 23 Pages.

* cited by examiner

RANGE IMAGING

BACKGROUND

A three dimensional (3D) range camera determines distances to features in a scene that it images and may provide the distances in a range image, also referred to as a 3D image, comprising three spatial coordinates for each of the features relative to an origin of coordinates located at the camera. An active illumination range camera provides range images of scenes that it images responsive to light reflected by features in the scene from light that the camera transmits to illuminate the scene. Typically, an active illumination range camera may illuminate a scene with structured or temporally modulated, optionally infrared (IR), light to acquire a range image of the scene. A range camera that illuminates a scene that it range images with structured light determines distances to features in the scene by triangulation to structures in the structured light that are reflected by the features. A range camera that illuminates a scene that it range images with temporally modulated light, determines round trip times for a temporal "marker" of the modulated light to travel from the camera to features in the scene and back to the camera. The camera uses the round trip time determined for a given feature in the scene and the speed of light to determine a distance to the given feature Whereas active illumination range cameras were originally relatively scarce and limited to technical, engineering, and scientific applications, active illumination range imaging technology has matured, and range cameras frequent components of a continually expanding catalog of consumer products. Range cameras may be found not only in video game consoles, but laptop computers, workbooks, tablets, smartphones, and even wrist watches.

SUMMARY

With the increase in the commercial popularity of range cameras, it is anticipated that various venues may periodically become crowded with many users attempting to simultaneously operate active illumination range cameras to range image scenes in, or from, the venue. As a result, it is expected that when a venue becomes crowded with users operating active illumination range cameras, light transmitted by an active illumination range camera in the venue may interfere with operation of another of the active illumination range cameras operating in the venue. An aspect of an embodiment of the disclosure therefore relates to providing a system, hereinafter also referred to as a "queueing system", which reduces interference between active illumination range cameras operating in a same venue.

A queueing system in accordance with an embodiment of the disclosure may comprise a queueing hub configured to identify and communicate with active illumination range cameras operating in a venue, hereinafter also referred to as a "queueing venue", in which the queueing hub is located. The queueing hub may be configured to detect light that an active illumination range camera operating in its queueing venue transmits to acquire range images, and to transmit control signals responsive to the detected light to the range camera. The range camera may be configured to distinguish the light that the range camera transmits to illuminate a scene by transmitting a distinguishing signal, optionally an identifying ID code, which is associated with the light and identifies the range camera, and to receive the control signals transmitted by the queueing hub. Upon detecting light transmitted by a plurality of active illumination range cameras simultaneously operating in its queueing venue to transmit light identified by their respective ID codes, the queueing hub transmits queueing ON signals to each of the range cameras addressed with the range camera's respective ID code. In response to receiving the queueing ON signals, the range cameras operate in a time division multiplexed (TDM) imaging mode for which, at any one time, only one of the range cameras operates to transmit light and acquire a range image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

In the detailed description below, aspects of a queueing system comprising a queueing hub that controls a plurality of active illumination range cameras to operate in a TDM imaging mode in accordance with an embodiment of the disclosure are discussed with reference to FIG. 1-FIG. 2C. The active illumination range cameras shown in the figures are assumed by way of example to be gated time of flight (GT-TOF) range cameras. A GT-TOF range camera generates and transmits temporally modulated light in a form of a train of light pulses to illuminate a scene that it range images. Following transmission of each light pulse in the train of light pulses, the GT-TOF camera may gate ON for a short exposure period to register amounts of light from the light pulse that features in the scene reflect back to the camera. The GT-TOF camera uses an amount of reflected light that it registers for the reflected light from a given feature in the scene during the short exposure periods following the light pulses to determine a round trip time for the given feature.

Figure 1:
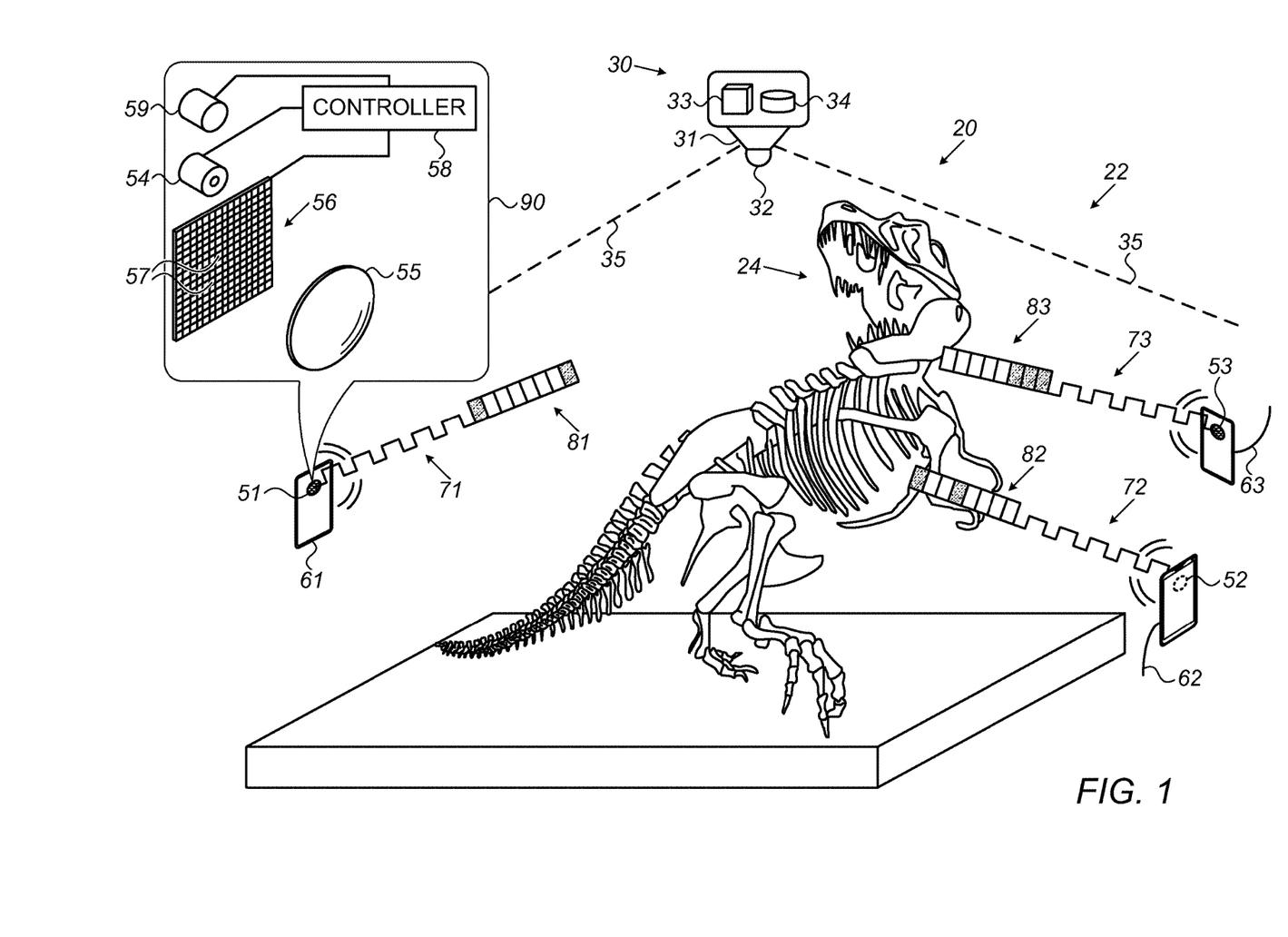
FIG. 1 schematically shows a queueing hub located, by way of example, in a museum venue to moderate interference between active illumination range cameras operating in the venue, in accordance with an embodiment of the disclosure.
Figure 3:
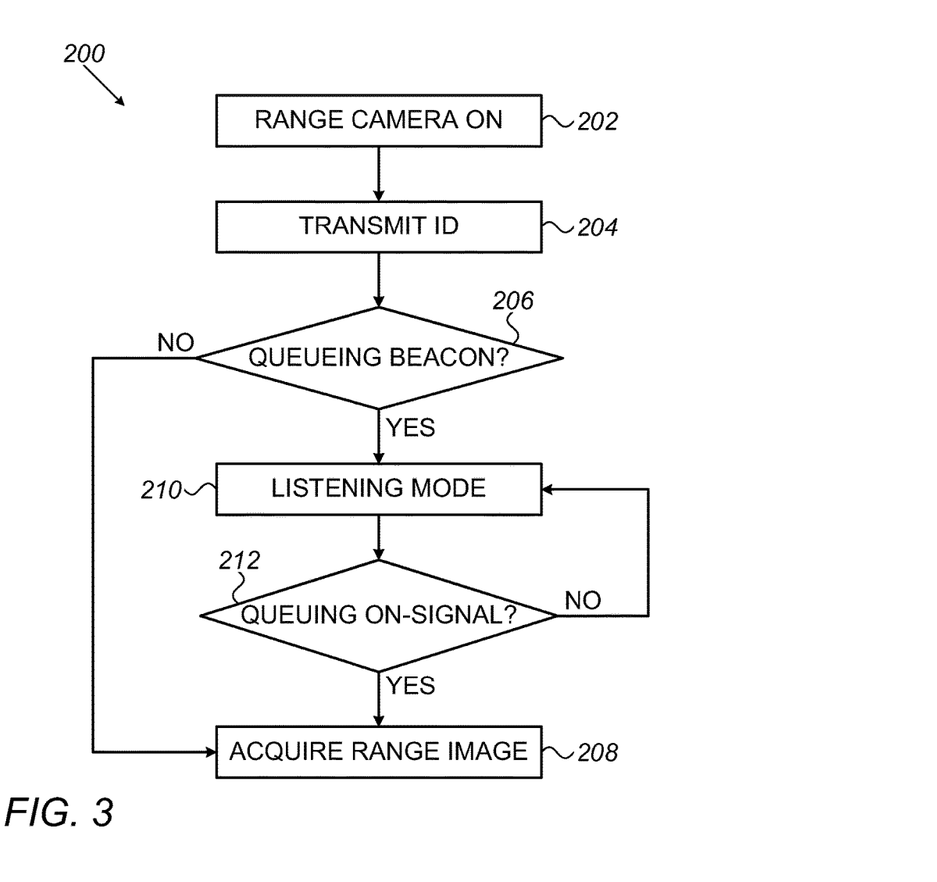
FIG. 3 shows a flow diagram of an algorithm that an active illumination range camera, such as a range camera shown in FIGS. 1-2C, executes to operate in a TDM imaging mode while in a queueing venue to acquire a range image, in accordance with an embodiment of the disclosure.
Figure 4:
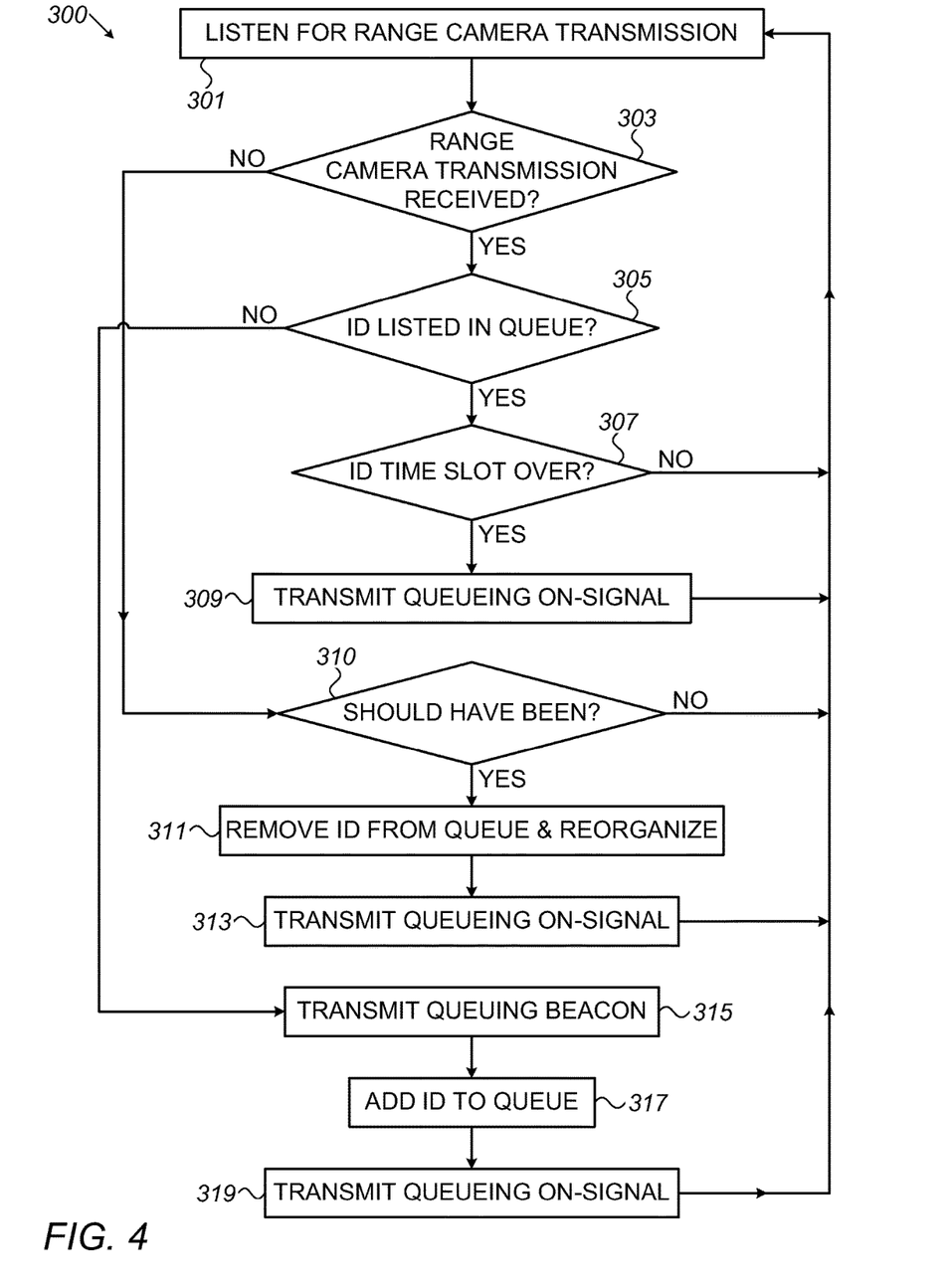
FIG. 4 shows a flow diagram of an algorithm that a queueing hub may execute to control active illumination range cameras operating in the queueing hub's queueing venue, in accordance with an embodiment of the disclosure.

FIG. 1 schematically shows the GT-TOF cameras operating substantially simultaneously to acquire range images of a tyrannosaurus skeleton on display in a museum venue, and as a result possibly interfering with each other's' operation. FIGS. 2A-2C schematically show the GT-TOF range cameras operating in a TDM imaging mode in accordance with an embodiment of the disclosure. FIG. 3 shows a flow diagram of an algorithm by which an active illumination range camera, such as a GT-TOF camera schematically shown in FIGS. 1-2C, operates in a queueing venue, in accordance with an embodiment of the disclosure. FIG. 4 shows a flow diagram by which a queueing hub, such as the queueing hub show in FIGS. 1-2C, may operate to control a plurality of active illumination range cameras to operate in a TDM imaging mode, in accordance with an embodiment of the disclosure.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins FIG. 1 schematically shows a queueing system 20 optionally comprising a queueing hub 30 configured, in accordance with an embodiment of the disclosure, to control a plurality of, by way of example, three GT-TOF range cameras 51, 52 and 53 in a museum venue 22 comprising a tyrannosaurus skeleton 24, also referred to as t-rex 24, on display. GT-TOF cameras 51, 52 and 53 are, optionally, comprised in smartphones 61, 62, and 63 respectively. In FIG. 1 the GT-TOF cameras are being operated by users (not shown) substantially simultaneously to acquire range images of t-rex 24, and are schematically shown simultaneously transmitting optionally IR light pulse trains 71, 72, and 73 respectively to illuminate the t-rex to acquire the range images.

In an embodiment, queueing hub 30 comprises an optical detector 31 configured to sense IR light pulse trains transmitted by GT-TOF range cameras, such as GT-TOF range cameras 51, 52, and 53, a transmitter 32 controllable to transmit queueing ON signals to the GT-TOF range cameras, a controller 33, and a memory 34. Controller 33 is configured to control transmitter 32 to transmit IR queueing control signals to GT-TOF range cameras 51, 52 and 53, responsive to illumination transmitted by the GT-TOF cameras received by detector 31, and data and executable instructions stored in memory 34. In an embodiment, the queueing hub maintains a queue optionally in memory 34 for active illumination range cameras in a queueing venue, such as museum venue 22 for which the hub mandates a TDM imaging mode and allocates exclusive imaging time periods, which may be referred to as time slots. Optionally, controller 33 controls the transmitter 32 to transmit queueing ON signals discussed below to active illumination range cameras listed in the queue, to alert the range cameras to allotment of imaging time slots for their respective exclusive use. Optionally the queuing ON signals comprise IR signals.

Embodiments of controller 33 may comprise any electronic and/or optical processing and/or control circuitry, and may by way of example, comprise any one or any combination of more than one of, a microprocessor, an application specific circuit (ASIC), field programmable array (FPGA) and/or system on a chip (SOC). Memory 34 may comprise any electronic and/or optical circuitry suitable for storing data and/or computer executable instructions and may, by way of example, comprise any one or any combination of more than one of a flash memory, random access memory (RAM), read only memory (ROM), erasable programmable read-only memory (EPROM), CD-ROM, or DVD.

Detector 31 is optionally configured having a relatively large field of view (FOV) schematically indicated by dashed lines 35 in FIG. 1 that is characterized by a view angle equal to or greater than about 60°. In an embodiment, optical detector 31 comprises a lens system (not shown) having a relatively short focal length and at least one IR optical sensor (not shown) located at a focal plane of the lens. IR transmitter 32, may have a relatively large field of illumination (FOL), optionally substantially coincident with FOV 35 of optical detector 31. In an embodiment, optical transmitter 32 comprises, by way of example, a short focal length lens (not shown) and at least one IR transmitting element (not shown), such as an IR laser or light emitting diode (LED), located substantially in the focal plane of the lens. In an embodiment, detector 31 may comprise any of various configurations of at least one mirror and sensor used in omnidirectional cameras to provide the detector with a wide angle FOV. Similarly, transmitter 32 may comprise a configuration of at least one mirror and a transmitting element having a geometry similar to any of various configurations of at least one mirror and a sensor found in an omnidirectional camera to provide the transmitter with a wide angle FOL.

Each GT-TOF camera 51, 52, and 53 optionally comprises components, which are shown for GT-TOF camera 51 greatly enlarged in an inset 90, and it is to be understood that discussion of the components and their operation with respect to GT-TOF camera 51 applies similarly to GT-TOF cameras 52 and 53. GT-TOF cameras 51, 52, and 53 comprise an IR light source 54, a lens system represented by a lens 55, and a photosensor 56 comprising pixels 57 on which lens system 55 images light received by the camera. A GT-TOF controller 58 in each GT-TOF camera 51, 52, and 53, controls transmission of light pulse trains by the camera's IR light source 54 and gating ON the camera's photosensor 56 for exposure periods to image and acquire distances to features of a scene, that the camera range images. In an embodiment, each GT-TOF camera 51, 52, and 53 comprises a wireless, optionally IR, communication interface 59 configured to receive queueing ON signals transmitted by queueing hub 30.

Whereas, in FIG. 1 GT-TOF cameras 51, 52, and 53 are shown simultaneously transmitting light pulse trains 71, 72, and 73, to range image t-rex 24, in accordance with an embodiment, controllers 58 comprised in the GT-TOF cameras may control the cameras responsive to queueing ON signals transmitted by queueing hub 30 to range image the t-rex at different times.

An embodiment of controller 58 of a GT-TOF camera 51, 52, or 53 may comprise any, or any combination of more than one, of various electronic and/or optical processing, memory, and/or control circuitry to support functionalities that it provides. In an embodiment of the disclosure, controller 58 is a smartphone controller comprised in a smartphone 61, 62, or 63, which comprises GT-TOF camera 51, 52, or 53 respectively. The smartphone controller 58 may be configured by an application software (APP) downloaded to the smartphone to control the GT-TOF camera comprised in the smartphone to cooperate with queuing hub 30 and operate in a TDM imaging mode in accordance with an embodiment of the disclosure.

In an embodiment of the disclosure, to cooperate with queueing hub 30 in supporting a TDM imaging mode, controller 58 is configured to control IR light source 54 in the GT-TOF camera that comprises the controller, to transmit a distinguishing ID code associated with light pulse trains that the IR light source transmits. The ID code identifies the light pulse trains and the GT-TOF camera 51, 52, or 52 comprising the light source that transmits the light pulse trains. Optionally, the ID code is transmitted as an IR encoded "header" transmitted at the beginning of each light pulse train that a GT-TOF camera 51, 52, and 52 transmits. In an embodiment, the ID code transmitted by a GT-TOF camera 51, 52, and 52 is an international mobile subscriber identity (IMSI) code of the subscriber identity module (SIM) in smartphone 61, 62, and 63 respectively that comprises the GT-TOF camera.

By way of example, In FIG. 1 GT-TOF light pulse trains 71, 72, and 73 transmitted by cameras 51, 52, or 53 to illuminate t-rex 24 are shown headed by, optionally binary ID codes 81, 82 and 83 respectively. ID codes 81, 82 and 83 may be IR ID codes encoded in accordance with any suitable encoding protocol or algorithm. For example, the ID codes may be encoded in IR light transmitted by light source 54 in accordance with an amplitude shift keying (ASK) or a frequency shift keying (FSK) modulation protocol. ID codes 81, 82 and 83 are shown, optionally, as eight bit binary codes comprising bits schematically represented by contiguous rectangles. A shaded rectangle in an ID code 81, 82, and 83 represents a binary "1" and an empty rectangle represents a binary "0". By way of example, ID codes 81, 82 and 83 that identify GT-TOF cameras 51, 52, and 53 are shown as binary codes, 100000001, 10010000, and 00000111 respectively.

Upon detecting transmissions of light pulse trains 71, 72, and 73, by GT-TOF cameras 51, 52, and 53 operating to substantially simultaneously range image t-rex 24 as shown in FIG. 1, queueing hub 30 operates to prevent their simultaneous operation and control their respective range imaging to execute in a TDM imaging mode. To initiate and mandate the TDM imaging mode for GT-TOF cameras 51, 52, and 53, queueing hub 30 registers the respective ID codes 81, 82, and 83 transmitted by the GT-TOF cameras in memory 34, and broadcasts a signal, which may be referred to as a queueing beacon, to the cameras. The queueing beacon instructs GT-TOF cameras 51, 52, and 53 to halt active illumination range imaging of t-rex 24. Queueing hub 30 then proceeds to sequentially provide each GT-TOF camera 51, 52, and 53 with an exclusive imaging time slot in which it may range image t-rex 24. In an embodiment, queueing hub 30 notifies each GT-TOF camera 51, 52, and 53 when an imaging time slot is available for its use by controlling IR transmitter 32 to broadcast a queueing ON signal comprising the GT-TOF camera's ID code. In response to GT-TOF 51, 52, or 53 receiving a queueing ON signal tagged with its ID code, TOF controller 58 in the GT-TOF camera controls light source 54 and photosensor 56 to acquire a range image of t-rex 24.

Figure 2A:
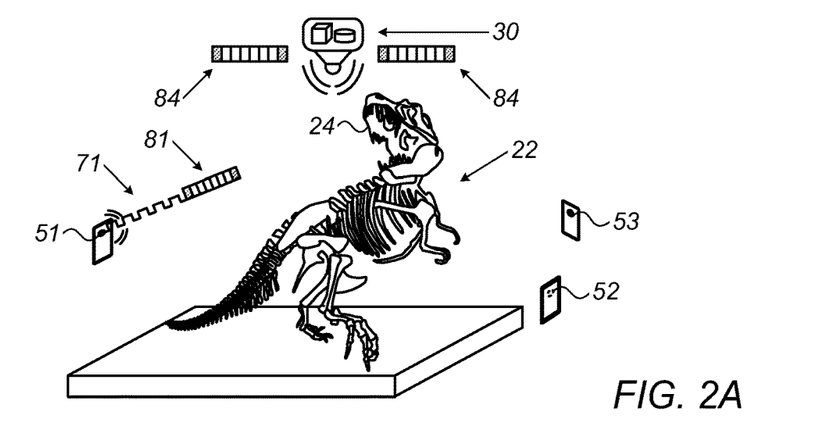
FIGS. 2A-2C schematically illustrate the queueing hub shown in FIG. 1 operating to control the range cameras so that they operate in a TDM imaging mode, in accordance with an embodiment of the disclosure.
Figure 2B:
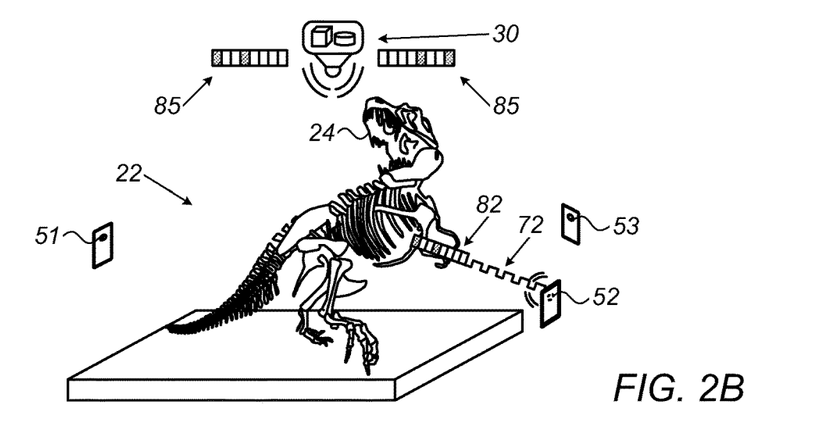
Figure 2C:
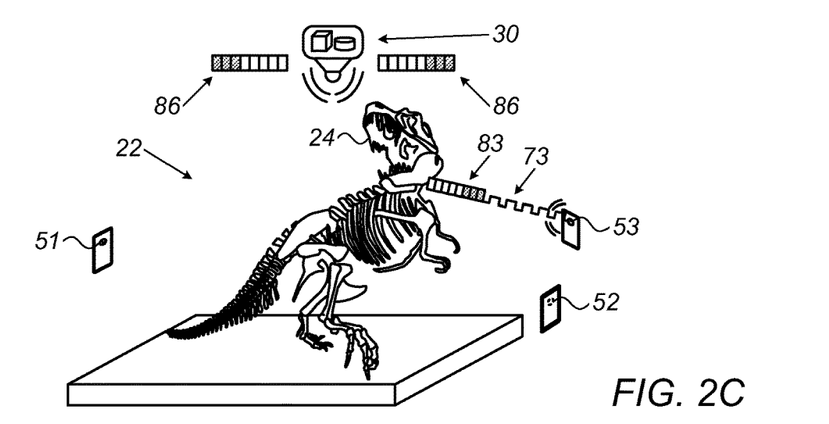

FIGS. 2A-2C schematically illustrate queueing hub 30 subsequent to transmitting a queueing beacon, broadcasting queueing ON signals to sequentially provide GT-TOF cameras 51, 52, and 53 with exclusive imaging time slots during which the cameras range image t-rex 24. In FIG. 2A a queueing hub 30 broadcasts a queueing ON signal 84 comprising ID code 81, 100000001, belonging to GT-TOF camera 51, and in response, the camera is schematically shown illuminating t-rex 24 with a light pulse train 71, optionally associated with an ID header comprising its ID code 81, to range image the t-rex. GT-TOF cameras 52 and 53 in museum venue 22 are inactive with respect to range imaging because they have not received a queueing ON signal tagged with their respective ID codes. Subsequent to GT-TOF 51 being assigned an exclusive imaging time slot by queueing hub 30, in FIG. 2B the queueing hub broadcasts a queueing ON signal 85 comprising ID code 82, 10010000, belonging to GT-TOF camera 52, and in the figure only GT-TOF camera 52 is illuminating t-rex 24 to acquire a range image of the t-rex. In FIG. 2C queueing hub 30 broadcasts a queueing ON signal 86 comprising the ID code 83, 00000111, of GT-TOF camera 53, and in the figure only GT-TOF camera 53 is shown illuminating t-rex 24 to acquire a range image of the t-rex.

FIG. 3 shows a flow diagram of a procedure 200 by which an active illumination range camera, such as a GT-TOF camera 51, 52, or 53, functions in a queueing venue comprising a queueing hub, such as queueing hub 30, that operates to mandate TDM imaging by active illumination range cameras operating in the venue.

In a block 202, while present in a queueing venue comprising a queueing hub in accordance with an embodiment of the disclosure, the active illumination range camera is turned ON by its user to acquire a desired range image of a scene in, or from, the venue. In a block 204, the range camera transmits its ID code, optionally together with transmitting illumination to illuminate the scene. In a decision block 206, the range camera determines whether it has received a queueing beacon from the queueing hub instructing the range camera to refrain from range imaging. The queueing hub may transmit the queueing beacon in response to sensing the ID code or illumination transmitted by the range camera. If the range camera determines it has not received a queueing beacon, the range camera optionally proceeds to a block 208 and goes ahead to acquire the range image of the scene desired by the user. On the other hand, if the range camera determines in decision block 206 that it has received a queueing beacon, the range camera proceeds to a block 210 and goes into a listening mode in which it abandons attempts to range image the scene and waits to receive a queueing ON signal from the queueing hub. In a decision block 212 the range camera determines whether it has received a queueing ON signal alerting the range camera that it has been allotted an imaging time slot during which it may be operated to range image the scene. If it determines that it has not received a queueing ON signal the range camera returns to the listening mode in block 210. On the other hand, if in decision block 212 the range camera decides that it has received a queueing ON signal, the range camera may proceed to block 208 and acquire the desired range image.

In an embodiment a queueing ON signal may alert a range camera that an imaging time slot is available substantially upon receipt of the queueing ON signal, or that the imaging time slot is available following a predetermined time lapse from receipt of the queueing ON signal. In an embodiment, the range camera comprises a user interface that the range camera operates to inform its user of the allotment of the imaging time slot. Optionally, the user interface comprises a display screen, on which the range camera displays information informing the user of the imaging time slot allotment and when the time slot begins. Any of various visual displays may be used to inform the user of the imaging time slot. For example, for an imaging time slot with delayed onset time, upon receipt of a queuing ON signal the range camera may display a colored status bar which shortens to zero with elapse of time as time to approach of the onset time decreases.

Whereas an active illumination range camera may update its user to allotment of an imaging time slot when operating in a TDM imaging mode, generally, a range image may be acquired by an active illumination range camera in a time period having duration of less than a few milliseconds (ms). As a result, for circumstances in which a queueing venue is sparsely populated, delays in acquisition of a range image by an active illumination range camera resulting from operation in a TDM imaging mode may not be readily sensed by a user, Operation in the TDM imaging mode may therefore be substantially transparent to the user. Under such circumstances the range camera in accordance with an embodiment may dispense with operating a user interface to update a user of allotment and/or timing of an imaging time slot.

FIG. 4 shows a flow diagram of a procedure 300 by which a queueing hub, such as queueing hub 30, may function in controlling active illumination range cameras, located in a same venue to operate in a TDM imaging mode, in accordance with an embodiment of the disclosure. In an embodiment, the queueing hub maintains a queue in a memory, for example memory 34 in queueing hub 30 (FIG. 1), for range cameras in the queueing venue for which the queueing hub mandates a TDM imaging mode and allocates exclusive imaging time slots. Optionally, as described above the queueing hub transmits control signals to the range cameras to manage allocation of the imaging time slots. The control signals may be control signals chosen from a group of control signals comprising a queueing beacon and queueing ON signals.

In a block 301, the queueing hub awaits for reception of, hereinafter also referred to as "listens for", optical transmissions comprising an ID code and optionally light for illuminating a scene from active illumination cameras that may be operating in its queueing venue, and in a decision block 303, determines if it has received such a transmission. If a transmission has been received, optionally in a decision block 305 the queueing hub determines if the transmission comprises an ID code listed in the queue that the queueing hub maintains in its memory. If the transmission does comprise a listed ID code, the queueing hub optionally proceeds to a decision block 307 to determine if an imaging time slot allotted for the range camera that transmitted the ID code is over. If the time slot is over, the queueing hub optionally proceeds to a block 309 and transmits a queueing ON signal comprising an ID code listed in the queue that optionally follows the received ID code in the queue. If the imaging time slot is not over, the queueing hub returns to block 301.

On the other hand if in block 305 the queueing hub determines that the transmission does not comprises an ID code listed in the queue, the queueing hub optionally proceeds to a block 315. In block 315 the hub transmits a queueing beacon that alerts all range cameras in the queueing venue that are configured to receive and respond to control signals from the queueing hub to cease any range imaging in process, and that TDM imaging, in accordance with an embodiment is temporarily halted. Optionally, the queueing hub then proceeds to a block 317 and adds the received, unlisted ID code to the queue in memory. In a block 319 the queueing hub may then return to the TDM operation mode and transmit a queuing ON signal comprising, optionally, a next ID code in the queue to allot an imaging time slot to a range camera associated with the ID code and return to block 301.

In block 301 the queueing hub listens for range camera transmissions and continues to decision block 303 to determine if such a transmission is received. If in the decision block, the queueing hub determines that it has not received a range camera transmission, the queueing hub proceeds to a decision block 310. In decision block 310 the queueing hub determines if an ID code should have been received from a range camera to which the queueing hub allotted an imaging time slot. If the queueing hub determines that an ID code was not due to be received, the queueing hub returns to block 301 to listen for range camera transmissions. On the other hand, if the queueing hub determines in block 310 that an ID code should have been but was not received from a range camera to which the queueing hub has allotted an imaging time slot, and that the range camera did not use the allotted imaging time slot and as a result did not transmit its ID code, the queueing hub optionally removes the range camera's ID code from the queue list. The queueing hub then proceeds to a block 313 to transmit a next ID code in the queue and returns to block 301 to listen for range camera transmissions.

It is noted that whereas in the above description the queueing hub and active illumination cameras are described as communicating by transmitting and receiving optical signals, practice of embodiments of the disclosure are not limited to optical communication. The range cameras and queueing hub may be configured to communicate using any of various wireless communication technologies and may, by way of example communicate using a proprietary radio frequency (RF) protocol or a standard protocol such as WiFi or blue tooth. In an embodiment the queuing hub and range cameras may communicate by exchanging acoustic signals. It is also noted that whereas active illumination range cameras configured to cooperate with a queuing hub to operate in a TDM operating mode are described above as being comprised in smartphones, an active illumination range camera in accordance with an embodiment of the disclosure may be comprised in any of various mobile communication devices, or may be an independent standalone device. It is further noted that whereas a queueing hub is schematically shown in the figures as a single entity comprising various components, a queuing hub may be configured as a distributed entity. For example, a queuing hub in accordance with an embodiment may have a plurality of separate optical detectors distributed in a venue for sensing light transmitted by active light range cameras in the venue. The detectors may communicate with each other and with a controller via, by way of example, Bluetooth or WiFi.

There is therefore provided in accordance with an embodiment of the disclosure, apparatus for controlling operation of a plurality of active illumination range cameras, the apparatus comprising: an optical detector configured to detect light that each of the plurality of active illumination range cameras transmits to illuminate a scene that the range camera images; a transmitter operable to transmit signals to the range camera; and a controller configured to: identify the range camera based on light transmitted by the range camera that the optical detector detects; determine start times for imaging time slots during which the range camera may range image a scene; and control the transmitter to transmit signals to the range camera that provide the start times of the imaging time slots.

Optionally, the controller is configured to determine a different exclusive time slot for each of the plurality of range cameras that does not overlap with any of the time slots determined for other range cameras of the plurality of range cameras. Additionally or alternatively, the range camera is optionally configured to transmit a distinguishing signal associated with the transmitted light that distinguishes the light transmitted by the range camera from light transmitted by others of the plurality of range cameras, which distinguishing signal the controller is configured to use to identify the range camera. Optionally, the distinguishing signal comprises at least one signal or any combination of more than one signal chosen from an optical signal, a radio frequency (RF) signal, and/or an acoustic signal. Optionally, the distinguishing signal comprises an optical signal that is comprised in the transmitted light. In an embodiment of the disclosure the distinguishing signal encodes an ID code.

In an embodiment of the disclosure the signals that the transmitter is configured to transmit to provide the range camera with start times of the imaging time slots comprises an identifying code based on the distinguishing signal that the range camera transmits and which indicate that the signals transmitted by the transmitter are intended for the range camera.

In an embodiment of the disclosure the apparatus comprises a memory comprising a list of the plurality of range cameras for which the controller determines time slots. Optionally, the controller is configured to add an additional range camera to the list and remove a listed range camera from the list.

Optionally, to add the additional range camera to the list the controller is configured to control the transmitter to cease transmitting signals providing the listed range cameras with the start times of imaging time slots, and subsequent to adding the additional range camera to the list to control the transmitter to transmit signals to the range cameras in the list that provide the start times of the imaging time slots. Additionally or alternatively, if a range camera in the list does not transmit light to illuminate a scene during an imaging time slot for which the transmitter transmitted a signal providing the range camera with a start time, the controller removes the range camera from the list.

In an embodiment of the disclosure the light transmitted by a camera of the plurality of active illumination range cameras to illuminate a scene comprises structured light.

In an embodiment of the disclosure the light transmitted by a range camera of the plurality of active illumination range cameras to illuminate a scene comprises temporally modulated light.

In an embodiment of the disclosure the light transmitted by a range camera of the plurality of active illumination range cameras comprises infrared (IR) light.

In an embodiment of the disclosure the signals that the transmitter transmits to a range camera of the plurality of range cameras that provide the start times of the imaging time slots comprise at least one signal or any combination of more than one signal chosen from an optical signal, a radio frequency (RF) signal, and/or an acoustic signal.

There is further provided in accordance with an embodiment of the disclosure, an active illumination range camera comprising: a light source controllable to transmit light to illuminate a scene that the active illumination range camera images; a wireless communication interface; and a controller configured to control the light source to illuminate a scene based on a signal transmitted by apparatus according to any of claims 1-15 that is received by the communication interface. Optionally, the range camera is comprised in a mobile computing device. Additionally or alternatively the light source transmits structured light. In an embodiment of the disclosure the light source transmits temporally modulated light.

There is further provided in accordance with an embodiment of the disclosure, a method of range imaging scenes using a plurality of active illuminating range cameras, the method comprising: detecting illumination that a plurality of cameras transmit; identifying the range cameras based on the detected transmitted light; determining start times for imaging time slots for each of the range cameras during which the range camera is the only range camera of the plurality of range cameras that may range image a scene; and transmitting signals based on the identities of the plurality of range cameras that provide the determined start times of the imaging time slots to the plurality of range cameras.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of the various embodiments in the present application are provided by way of example and are not intended to limit the scope of the claimed subject matter. The described embodiments comprise different features, not all of which are required in all embodiments of the subject matter. Some embodiments utilize only some of the features or possible combinations of the features. Variations of embodiments that are described, and embodiments comprising different combinations of features noted in the described embodiments, will occur to users of the art. The scope of the invention is defined by the claims.

The invention claimed is:

1. Apparatus for controlling operation of a plurality of active illumination range cameras, the apparatus comprising:
    an optical detector configured to detect light that each of the plurality of active illumination range cameras transmits to illuminate a scene that each of the plurality of active illumination range cameras images;
    a transmitter operable to transmit signals to the plurality of active illumination range cameras; and
    a controller configured to:
    identify an additional active illumination range camera based on a signal associated with the light transmitted by the active illumination range camera that the optical detector detect;
    based at least on identifying the additional active illumination range camera, send an instruction to the plurality of active illumination range cameras to cease any range imaging in progress;
    determine start times for imaging time slots during which the active illumination range cameras and the additional active illumination range camera may image a scene; and
    control the transmitter to transmit signals to the active illumination range cameras and the additional active illumination range camera that provide the start times of the imaging time slots.

2. The apparatus according to claim 1 wherein the controller determines a different exclusive time slot for each of the plurality of active illumination range cameras that does not overlap with any of the time slots determined for other active illumination range cameras of the plurality of active illumination range cameras.

3. The apparatus according to claim 1 wherein the signal comprises at least one signal or any combination of more than one signal chosen from an optical signal, a radio frequency (RF) signal, and/or an acoustic signal.

4. The apparatus according to claim 3 wherein the signal comprises an optical signal that is comprised in the transmitted light.

5. The apparatus according to claim 1 wherein the signal encodes an ID code.

6. The apparatus according to claim 1 wherein the signals that the transmitter transmits to provide the active illumination range camera with start times of the imaging time slots comprises an identifying code based on the signal that the active illumination range camera transmits and which indicate that the signals transmitted by the transmitter are intended for the active illumination range camera.

7. The apparatus according to claim 1 further comprising a memory, wherein the memory comprises a list of the plurality of active illumination range cameras for which the controller determines time slots.

8. The apparatus according to claim 7 wherein the controller is configured to add an additional active illumination range camera to the list and remove a listed active illumination range camera from the list.

9. The apparatus according to claim 8 wherein to add the additional active illumination range camera to the list the controller is configured to control the transmitter to cease transmitting signals providing the listed active illumination range cameras with the start times of imaging time slots, and subsequent to adding the additional active illumination range camera to the list to control the transmitter to transmit signals to the active illumination range cameras in the list that provide the start times of the imaging time slots.

10. The apparatus according to claim 8 wherein if an active illumination range camera in the list does not transmit light to illuminate a scene during an imaging time slot for which the transmitter transmitted a signal providing the active illumination range camera with a start time, the controller removes the active illumination range camera from the list.

11. The apparatus according to claim 1 wherein the light transmitted by the active illumination range camera of the plurality of active illumination range cameras to illuminate a scene comprises structured light.

12. The apparatus according to claim 1 wherein the light transmitted by the active illumination range camera of the plurality of active illumination range cameras to illuminate a scene comprises temporally modulated light.

13. The apparatus according to claim 1 wherein the light transmitted by the active illumination range camera of the plurality of active illumination range cameras comprises infrared (IR) light.

14. The apparatus according to claim 1 wherein the signals that the transmitter transmits to the active illumination range camera of the plurality of active illumination range cameras that provide the start times of the imaging time slots comprise at least one signal or any combination of more than one signal chosen from an optical signal, a radio frequency (RF) signal, and/or an acoustic signal.

15. A method of range imaging scenes using a plurality of active illuminating range cameras, the method comprising:

detecting illumination that a plurality of active illumination range cameras transmit;

identifying an additional active illumination range camera based on a signal associated with the detected transmitted light;

based at least on identifying the additional active illumination range camera, sending an instruction to the plurality of active illumination range cameras to cease any range imaging in progress;

determining start times for imaging time slots for the additional active illumination range camera during which the additional active illumination range camera is the only active illumination range camera of the plurality of active illumination range cameras that may image a scene; and transmitting signals to the active illumination range camera that provide the determined start times of the imaging time.

16. Apparatus for controlling operation of a plurality of active illumination range cameras, the apparatus comprising:

an optical detector configured to detect light that each of the plurality of active illumination range cameras transmits to illuminate a scene that each of the plurality of range cameras images;

a transmitter operable to transmit signals to the plurality of active illumination range cameras; and a controller configured to:

identify an additional active illumination range camera based on light transmitted by the active illumination range camera that the optical detector detects;

based at least on identifying the additional active illumination range camera, send an instruction to the plurality of active illumination range cameras to cease any range imaging in progress;

determine start times for imaging time slots during which the additional active illumination range camera may image a scene;

control the transmitter to transmit signals to the additional active illumination range camera that provide the start times of the imaging time slots; and cease transmitting start times to the additional active illumination range camera if the additional active illumination range camera does not transmit light to illuminate the scene during an imaging time slot for which the transmitter transmitted a signal providing the additional active illumination range camera with a start time.

17. The apparatus of claim 16, wherein the signal comprises at least one signal or any combination of more than one signal chosen from an optical signal, a radio frequency (RF) signal, and/or an acoustic signal.

18. The apparatus of claim 17, wherein the signal comprises an optical signal that is comprised in the transmitted light.

19. The apparatus of claim 17, wherein the signal encodes an ID code.

20. The apparatus of claim 16, wherein the light transmitted by the active illumination range camera of the plurality of active illumination range cameras to illuminate a scene comprises structured light.

* * * * *